United States Patent [19]

Strange

[11] Patent Number: 4,991,061
[45] Date of Patent: Feb. 5, 1991

[54] ADJUSTABLE STARTER BASEPLATE ASSEMBLY

[75] Inventor: Casey J. Strange, Muncie, Ind.

[73] Assignee: Westinghouse Electric Corp., Pittsburgh, Pa.

[21] Appl. No.: 411,062

[22] Filed: Sep. 22, 1989

[51] Int. Cl.$^5$ ............................................. H05K 5/00
[52] U.S. Cl. .................................. 361/417; 174/52.1; 248/295.1; 361/419; 361/427
[58] Field of Search ............... 361/331, 332, 333, 346, 361/347, 348, 349, 350, 357, 359, 391, 393, 394, 417, 419, 420, 427, 429, 430; 248/295.1, 300, 900; 174/52.1, 50.51; 439/215, 216, 529, 533, 534, 536, 540, 542

[56] References Cited
U.S. PATENT DOCUMENTS
4,847,733 7/1989 Roy et al. ............................. 248/300

Primary Examiner—Leo P. Picard
Assistant Examiner—Donald A. Sparks
Attorney, Agent, or Firm—M. J. Moran

[57] ABSTRACT

An adjustable starter baseplate assembly is disclosed for use in mounting a contactor unit and an overload relay unit. The baseplate assembly comprises a support plate and an adjustable extension plate. The support plate has a first mounting surface which has a plurality of threaded openings thereon at least two of which will match the mounting footprint of a contactor unit to be mounted thereon. The extension plate has slots therein which are aligned with threaded mounting holes on a second mounting surface of the support plate. An electrical component, preferably an overload relay, is mounted onto the extension plate and the same screw fasteners are used to mount the overload relay to the baseplate assembly and to secure the extension plate in the appropriate position onto the support plate. The assembly is adjustable such that it may be used with a variety of sizes of housing enclosures.

12 Claims, 2 Drawing Sheets

ADJUSTABLE STARTER BASEPLATE ASSEMBLY

BACKGROUND OF THE INVENTION

1. Field of the Invention

The invention relates to a baseplate assembly for a starter unit on which a motor contactor component and an overload relay component are mounted. The baseplate assembly is adjustable to conform to the various enclosures or cabinets in which starter units are housed and to the various footprints of mounting screws in such enclosures and cabinets. The invention is also adaptable to accommodate various mounting footprints on contactors and relays used in the industry.

2. Background Information

Large electric motors typically utilize starter units including a contactor unit and an overload relay unit which are both mounted on a baseplate. The baseplate is then housed in an enclosure or cabinet. In the field, competitors use differently dimensioned enclosures and cabinets with various patterns of mounting screws for housing starter units. This could require that several different sizes of baseplates be available depending upon the enclosure or cabinet used in the particular application. In addition, components themselves may have different mounting footprints. A mounting footprint describes the location of the mounting holes through which screws are fastened into tapped holes in the baseplate on which the component is to be mounted.

The dimensions of the baseplate must conform to the dimensions of the compartment or enclosure in which the starter is to be housed, the pattern of mounting holes in such compartment or enclosure and to the dimensions and footprint of the equipment to be mounted thereon. For example, a single baseplate which is long enough to contain all of the mounting holes necessary to accommodate the various mounting footprints of the equipment may be too long to fit in the enclosure or control cabinet being used.

At present, users must purchase baseplates of specific dimensions for each different combination of enclosures and equipment being used.

There remains a need for a starter baseplate which is adjustable and can accommodate many sizes of enclosures and cabinets with various mounting screw footprints. There is also a need for a baseplate which can be used with several different components having different mounting footprints. In this way, a single completed unit can be manufactured and sold to many different users who may then adjust the baseplate to fit the enclosure, or have it factory-adjusted prior to shipping, to suit their own equipment and enclosure dimensions.

SUMMARY OF THE INVENTION

These and other needs are satisfied by the apparatus of the present invention for an adjustable starter baseplate assembly. We disclose an adjustable baseplate having two parts, a stationary support plate and a movable extension plate. The movable plate has slots which in the preferred form overlap threaded holes in the stationary plate. The movable plate can be adjusted to the desired length, then the appropriate component, preferably the overload relay, is fastened to the baseplate through the movable plate. The same fastening screws are used to secure the component as well as the movable plate, in the desired position, to the support plate.

BRIEF DESCRIPTION OF THE DRAWINGS

A full understanding of the invention can be gained from the following description of the preferred embodiments when read in conjunction with the accompanying drawings in which.

DESCRIPTION OF THE PREFERREd EMBODIMENTS

Figures 1, 3:
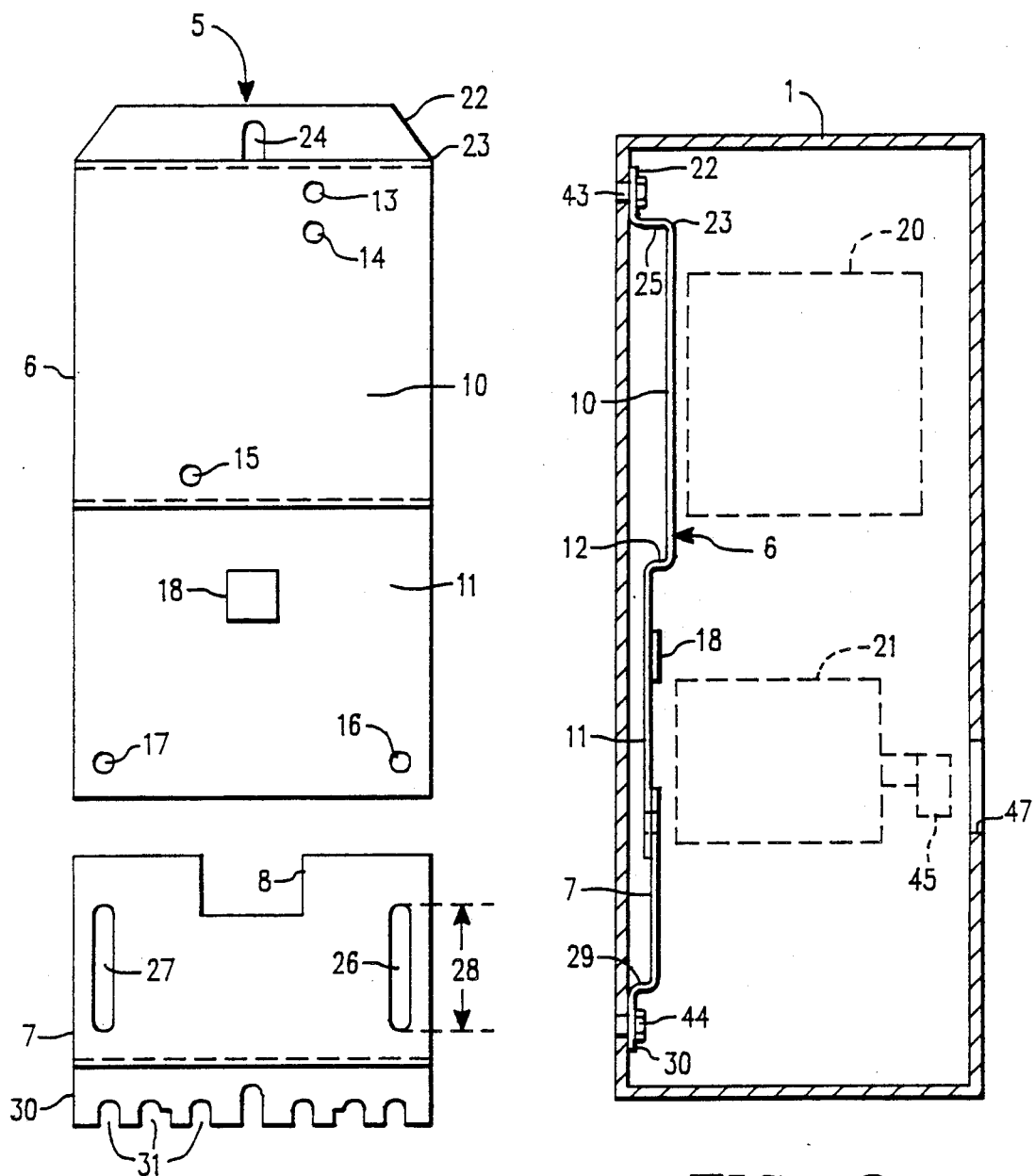
FIG. 1 is a top plan view of the starter baseplate assembly of the present invention disassembled.
FIG. 3 is a side sectional view through an enclosure in which the starter baseplate assembly of the present invention is mounted.

Referring now to FIG. 1, there is shown a top plan view of the preferred embodiment of the present invention. Starter baseplate assembly 5 is comprised of two plates: support plate 6 and adjustable extension plate 7. Support plate 6 is generally rectangular and it has two mounting surfaces 10, 11 upon which electrical components may be mounted. In a preferred form, the first mounting surface 10, has three threaded holes 13, 14 and 15 to which a contactor unit 20 (see FIG. 2) is to be secured. The threaded holes are placed at predetermined locations to accommodate different mounting footprints on different contactors. Various sizes of support plates 6 can be manufactured each of which accommodate a range of contactor sizes and which each have a maximum number of mounting footprints to provide for mounting of all contactors in that range. In the exemplary embodiment, certain contactor units would have a mounting footprint matching holes 13 and 15. Other contactor units would have a mounting footprint corresponding to holes 14 and 15. As mentioned above, it should be understood that the support plate may also be made in various sizes and designed with a different combination of mounting holes depending upon the application for which it is to be used.

Mounting surface 11 of support plate 6 preferably has two threaded holes 16 and 17 adapted to conform to the mounting footprint of an overload relay. Mounting surface 11 also has raised boss 18 to support the overload relay (not shown). Raised boss 18 is better shown in FIG. 3 which is a cross-sectional view of the preferred embodiment of the present invention. Raised boss 18 is located on mounting surface 11 of support plate 6. The height of raised boss 18 is substantially equal to the thickness of extension plate 7, discussed below. Thus, raised boss 18 supports overload relay unit 21 when it is mounted in a preferred form with extension plate 7 overlapping support plate 6. As discussed below, extension plate 7 may adjusted to the desired position on top of support plate 6. The same fasteners are used to mount the overload relay 21 in mounting holes 16 and 17 and to secure extension plate 7 in place. When extension plate 7 is fully extended, overload relay 21 is cantilevered beyond the plate 7 but is supported by raised boss 18. When extension plate 7 is fully retracted, the cutout 8 accommodates the boss 18.

Support plate 6 may also have outwardly extending flange 22 (see FIG. 3). At the edge, 23, of the face of plate 6, an offset portion 25 is provided normal to the mounting surface 10. Outwardly extending flange 22 is provided adjacent to the offset portion 25 and flange 22 is provided in a plane parallel to mounting surface 10.

Figure 2:
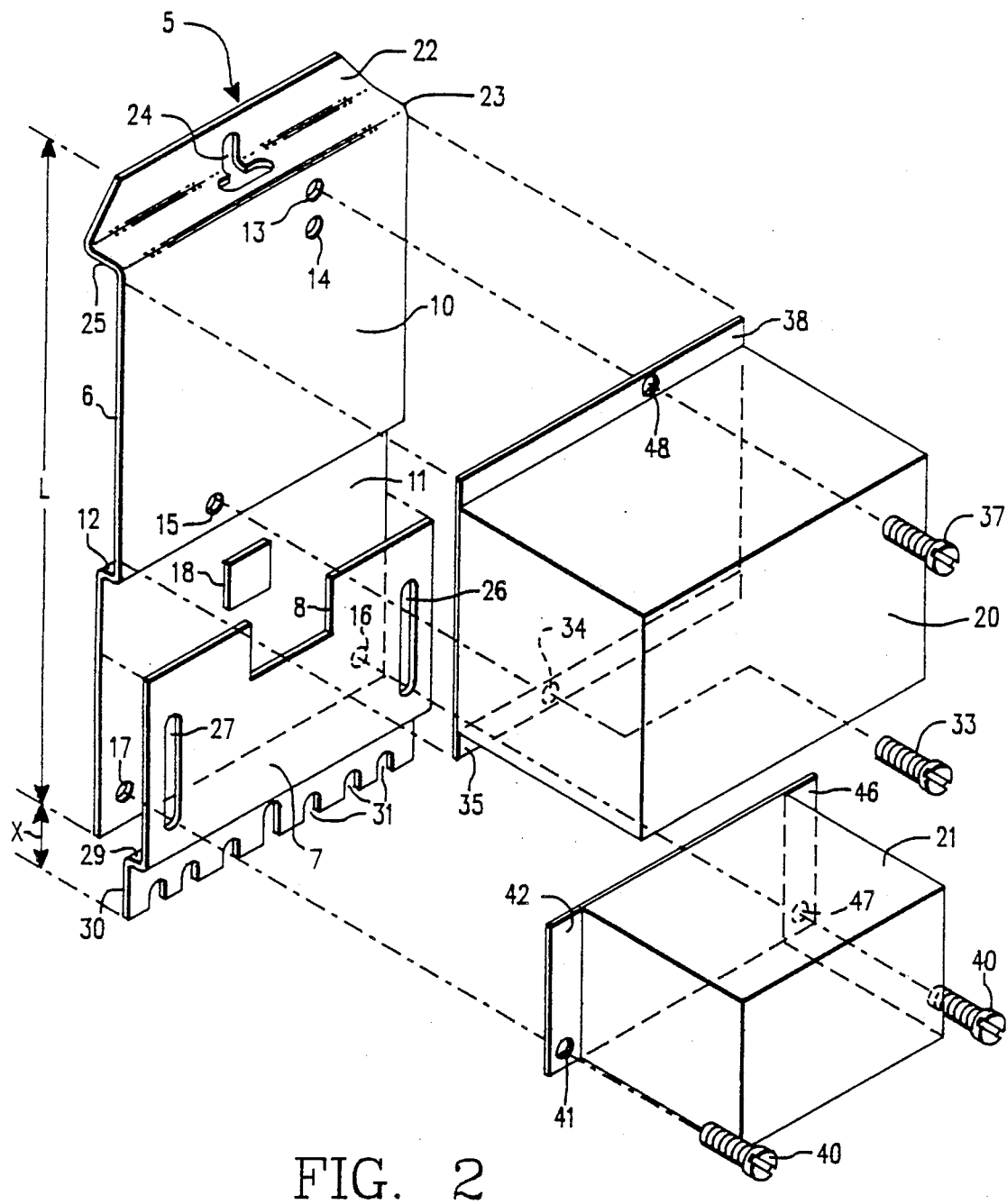
FIG. 2 is an exploded isometric view illustrating assembly of the baseplate assembly of the invention and mounting of the starter components thereon.

As seen in FIG. 2, support plate 6 may be provided with a second offset 12 such that mounting surfaces 10 and 11 are in different planes. The height of the second offset 12 may be varied in order to conform to the enclosure 1 in which the equipment is to be housed.

Referring to FIG. 3, overload relay unit 21 is typically provided with a reset button 45. The reset button 45 must be accessible to an operator from outside the enclosure 1. The offset 12 between mounting surfaces 10 and 11, discussed above, is such that the various size overload relays 21 will fit in all of the existing cabinets and enclosures.

A mounting slot 24 for the support plate 6 extends into the flange 22 and the offset 25. The portion of the slot 24 in the offset 25 is wider than the portion in flange 22 (see FIGS. 1 and 2) to accommodate the head of a mounting screw. With this arrangement, the assembly 5 can be slipped over the head of a loosened screw which is then tightened against flange 22. Typically, the assembly is mounted on a vertical wall of an enclosure by such a mounting screw as will be discussed below.

The adjustable extension plate 7 has slots 26 and 27 which are aligned and mate with threaded holes 16 and 17, respectively, of support plate 6 to provide for the adjustment of extension plate 7. The length 28 of slots 26 and 27 defines the range of positions to which extension plate 7 may be adjusted and fixed to support plate 6.

Extension plate 7 has an offset portion 29 which is perpendicular to the face of plate 7 (FIG. 2). Extending perpendicular from offset portion 29 is flange 30. Flange 30 is in the same plane as flange 22 of support plate 6 when it is mounted in the exemplary form, on top of plate 6. Flange 30 is provided with a plurality of openings 31 along the edge (FIG. 1). These openings 31 are of predetermined geometry, dimensions and spacing to accommodate mounting screws threaded into the wide variety of patterns of tapped holes in control cabinets or enclosures found in the field.

In operation, the assembly 5 of the present invention is used for mounting of a suitable starter unit. Referring to FIG. 2, extension plate 7 of assembly 5 is secured on top of support plate 6 and is adjusted into the appropriate position such that the combined length L of plate 6 and the remainder "X" of extension plate 7 is of a predetermined desired amount which is suitable for the application.

Contactor unit 20 is preferably mounted on support plate 6 by securing screw 33 inserted through a mounting hole 34 of a first mounting flange 35, and screwed into the threaded hole 15 in support plate 6. Similarly, screw 37 is passed through mounting hole 48 of a second mounting flange 38 on the contactor unit, and screwed into the threaded hole 13 which is appropriate for the mounting footprint of the contactor being used.

Overload relay unit 21 is mounted to the assembly 5 by means of screws 40 passed through mounting hole 41 of the mounting flange 42 of overload relay unit 21 and through a mounting hole 47 in mounting flange 46 on the other side of overload relay unit 21. The screws 40 then pass through slots 26 and 27 of extension plate 7 and are threadedly engaged in holes 16 and 17 of support plate 6. It can be seen that the same screws 40 are used for mounting overload relay unit 21 as well as for securing extension plate 7 to support plate 6 at the desired position.

The entire assembly with the contactor and overload relay mounted thereon is inserted vertically into a suitable enclosure 1 as shown schematically in FIG. 3. Slot 24 in the top of support plate 6 is slipped over the upper mounting screw 43 near the top of the enclosure 1. At the bottom of baseplate assembly 5, openings 31 are arranged in alignment with lower mounting holes of housing enclosure 1 which holes are not shown in the drawings. Such holes may be in different configurations and the various cutouts in flange 30 are provided so that all configurations can be accommodated. Screws 44 are used to secure the assembly to the mounting holes provided at the appropriate opening in flange 30. The screws 43 and 44 are then secured to tightly engage the flanges 22 and 30 respectively and thereby firmly mount the assembly 5 in the enclosure. As shown in FIG. 3, the reset button 45 on the overload relay 21 is accessible through an opening 47 in the enclosure 1.

It should be understood that the assembly may be adjusted to a variety of positions to accommodate many different combinations of housing enclosures for starter equipment. The invention is simple to use and it avoids the necessity of having a baseplate for each compartment or enclosure and for each combination of contactors and overload relays.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An adjustable baseplate assembly for mounting electrical components provided with mounting holes in one of any number of housing enclosures having mounting openings arranged in different patterns, said baseplate assembly comprising, a generally rectangular support plate member having a first mounting surface on a face thereof adjacent one end of the support plate member and a second mounting surface on the face thereof adjacent the other end of the support plate member, said support plate member having a first set of threaded holes placed at predetermined locations on the first mounting surface thereof said first set of threaded holes being arranged in a pattern aligned with at least two of the mounting holes of a first electrical component, said support plate member also having a first set of mating (openings placed at predetermined locations on the second mounting surface thereof and arranged in a pattern which aligns with at least two of the mounting holes of a second electrical component, said support plate member further having at least one mounting opening adjacent said one end thereof;

a generally rectangular adjustable extension plate member having a mounting surface on a face adjacent one end thereof which engages said support plate member, and a free end opposite the one end, said free end having at least one mounting opening therein, said mounting surface having a second set of mating openings arranged in a pattern which aligns with at least two mounting holes in the second electrical component, said other end of said support plate member and said one end of the extension plate member overlapping one another with one member between the other electrical component and the other member, said mating openings of said one member providing adjustment of overlap of the extension plate member relative to the support plate member to align said at least one mounting opening in each of the support plate member and the extension plate member with mounting openings in a selected one of said housing enclosures, the mating openings of the other of said members being a second set of threaded holes;

first fastening means securing said first electrical component to said baseplate assembly through the mounting holes of said first electrical component to at least two of the threaded holes of the first set of threaded holes in said support plate member, second fastening means securing said second electrical component to said baseplate assembly and securing the extension plate member to the support plate member with at least one mounting opening in said support plate member and said at least one mounting opening in the extension plate member aligned with mounting openings in said selected housing enclosure, said second fastening means extending through the mounting holes in the second electrical component, the mating openings in said one member and into at least two of the threaded holes in said second set of threaded holes in the other member; and a third set of fasteners securing said baseplate assembly to said selected housing enclosure extending through said at least one mounting opening in said support plate member and said at least one mounting opening in said extension plate member and into mounting openings in the selected housing enclosure with which at least one mounting opening in each of the support plate member and the extension plate member are aligned.

2. The baseplate assembly of claim 1 wherein said mating openings in said one member are slots providing continuous adjustment along their length of the distance between said at least one mounting opening in the support plate member and the at least one mounting opening in the extension plate member.

3. The baseplate assembly of claim 2 wherein said one member is said extension plate member with said slots and said other member is said support plate member having said second set of threaded holes, and wherein said extension plate member is clamped between said second electrical component and said support plate member by said second fastening means extending through the mounting holes in said second electrical component, the slots in said extension plate member and into the second set of threaded holes in said support plate member.

4. The baseplate assembly of claim 3 wherein said extension plate member has a raised boss on the mounting surface thereof adapted to provide a level support surface for said second electrical component when it is mounted on said extension plate member.

5. The baseplate assembly of claim 4 wherein said extension plate member has a cutout portion on the other end thereof, with the cutout portion having a width greater than the width of said raised boss so that when the assembly is adjusted to its shortest position, the cutout portion of said extension plate member accommodates the raised boss.

6. The baseplate assembly of claim 5 wherein said support plate member has an offset portion normal to said one end thereof and an outwardly extending flange parallel to said support plate member and perpendicular to said offset portion.

7. The baseplate assembly of claim 6 wherein said extension plate member has an offset portion normal to the face thereof and a flange extending outwardly and normal to the offset portion and terminating in a free edge, with the at least one mounting opening in said extension plate member comprising slots in said free edge of said flange.

8. The baseplate assembly of claim 7 wherein said mounting surfaces of said support plate member are offset from one another and are dimensioned such that the flange of said support plate member and the flange in said extension plate member are in a common plane.

9. The baseplate assembly of claim 8 wherein said offset between the mounting surfaces of said support plate member are in different, but parallel planes.

10. The baseplate assembly of claim 9 wherein said first electrical component is a contactor.

11. The baseplate assembly of claim 10 wherein said second electrical component is an overload relay.

12. The baseplate assembly of claim 11 in combination with an overload relay having a reset button thereon, wherein said mounting surfaces of said support plate member are offset and dimensioned to provide that said reset button is in a predetermined accessible position.

* * * * *